United States Patent [19]

Yuan

[11] Patent Number: 5,120,415

[45] Date of Patent: Jun. 9, 1992

[54] METHOD OF IMPROVING THE PROPERTIES OF COATED REINFORCED THERMOPLASTIC ARTICLES AND PRODUCTS OBTAINED THEREBY

[75] Inventor: San C. Yuan, Farmington Hills, Mich.

[73] Assignee: E. I. du Pont de Nemours and Company, Wilmington, Del.

[21] Appl. No.: 719,953

[22] Filed: Jun. 24, 1991

Related U.S. Application Data

[63] Continuation of Ser. No. 477,781, Feb. 9, 1990.

[51] Int. Cl.$^5$ ............................................. C25D 13/12
[52] U.S. Cl. ........................... 204/181.1; 204/181.4; 204/181.7; 427/379; 427/409
[58] Field of Search .................... 204/181.4, 181.7; 427/379, 409

[56] References Cited

U.S. PATENT DOCUMENTS

| | | | |
|---|---|---|---|
| 4,375,498 | 3/1983 | Le Minez et al. | 204/181.1 |
| 4,933,214 | 6/1990 | Sugiura et al. | 427/379 |

*Primary Examiner*—John Niebling
*Assistant Examiner*—Kishor Mayekar
*Attorney, Agent, or Firm*—James T. Corle

[57] ABSTRACT

A method for improving the properties of a coated reinforced thermoplastic substrate which forms surface irregularities when cooled after being heated to elevated temperatures is disclosed. The method comprises coating the substrate with primer coating compositions, wet-on-wet, comprising first applying a rigid primer composition followed by applying a flexible primer composition, curing the composite primer coating and thereafter applying a topcoating. The coated substrates exhibit improved properties, especially distinctness of image (DOI).

11 Claims, No Drawings

METHOD OF IMPROVING THE PROPERTIES OF COATED REINFORCED THERMOPLASTIC ARTICLES AND PRODUCTS OBTAINED THEREBY

This is a continuation of application Ser. No. 07/477,781, filed Feb. 9, 1990.

BACKGROUND OF THE INVENTION

1. Field of the Invention

The present invention relates to a process of coating reinforced thermoplastic substrates with a plurality of coatings to provide a coated substrate having improved visual and physical properties.

2. Brief Description of the Prior Art

The use of plastic components in combination with metal parts is common in the production of automobiles. Mixtures of resins an reinforcing materials such as fibers, flakes and particulate materials are used as bulk molding or sheet molding compounds, BMC and SMC, which are molded to form various shaped articles. Generally, in applications requiring high quality painted surfaces, highly filled thermosetting SMCs have been used.

In recent years thermoplastic resins which can be subjected to elevated temperatures have been developed. Due to their thermoplastic property, these materials are particularly attractive since trimmings and off-specification parts can be reclaimed for further use. However, the presence of reinforcing fibers and particulates adversely affects the appearance of coated articles unless the coated thermoplastic substrate is highly filled as with SMC substrates or the particles have small diameters and low aspect ratios.

When a reinforced thermoplastic substrate is coated and baked at an elevated temperature, the surface of the coated substrate appears to be smooth, however, upon cooling irregularities form on the surface giving an unacceptable distinctness of image (DOI). The development of surface irregularities appears to be associated with a difference in the coefficient of expansion between the thermoplastic resins and the reinforcing components. The irregularites are accented when the coated reinforced thermoplastic substrates are used in multi-component assemblies. The problem is particularly evident in applications in which reinforced thermoplastic panels are assembled adjacent metal panels in an automobile body. In the automobile industry any substantial difference in the quality of appearance of the coating on the plastic part and the adjacent metal part is unacceptable.

The quality of the surface of the coating on the parts can be measured using a commercially available distinctness of image (DOI) meter. Reflected light intensity from a photo detector is measured as a function of the scattering angle. If the scattering function is short and wide, the surface is said to have a low DOI. If the scattering is limited, the surface has high distinctness. DOI meters detect the reflected light in a region slightly away from the specular angle. If the light detected is small, the distinctness is high. DOI is measured on a scale from 0 to 100 with 100 being the highest level of smoothness.

Various methods have been disclosed for applying finishes to reinforced plastic substrates. U.S. Pat. No. 4,737,403 discloses coating a substrate with a specially formulated primer. From the DOI data disclosed in the patent, the use of the special primer appears to work well with an SMC "PHASE ALPHA" from Ashland Chemical Company. However, SMCs which are highly filled do not presemt the same problems as those encounted in coating reinforced thermoplastic materials which have a relatively low filler content.

Rendering the plastic substrate highly conductive so that the plastic part may be simultaneously electrocoated with metal parts by submerging the multi-material workpiece in an electrocoating bath is disclosed in U.S. Pat. No. 4,745,012. It is said that the primer applied to the plastic substrate renders the substrate coatable in the electrocoating bath. In coating the plastic substrate with the electrocoating primer, the primer is not utilized for its generally recognized purpose of providing corrosion protection of the metal parts. The quality of the final coated surface is not disclosed in the patent.

In practice, thermoplastic substrates having low reinforcing filler content require application of successive primer coatings and curing each primer coating before applying a topcoating in order to provide a quality coating with an acceptable DOI. Lightly sanding the primed surface improves the quality of the coating. Curing each primer coating entails heating the coated substrate to an elevated temperature for an extended period of time which is expensive from a time and cost standpoint.

It is therefore an object of this invention to provide a method for coating reinforced thermoplastic substrates which is cost efficient and provides products having improved properties.

SUMMARY OF THE INVENTION

In accordance with the present invention, there is provided a method for improving the appearance (DOI) and other physical properties of a coated reinforced thermoplastic substrate.

The method comprises the steps of applying to the reinforced thermoplastic substrate, wet-on-wet, a first coating composition comprising a rigid primer coating composition having a thickness of from about 0.2 to 5 mils and a second coating composition comprising a flexible primer coating composition having a thickness of from about 1 to 5 mils, curing the composite primer coating, applying a topcoating composition to the primed surface to form a continuous topcoat and thereafter curing the topcoating.

The reinforced thermoplastic substrates used in accordance with this invention are those which exhibit surface irregularities upon cooling after being coated and heated to an elevated temperature to cure the coating. These surface imperfections are pronounced when the particles, flakes and fibers used as reinforcing fillers have an average diameter greater than 5 microns and an average aspect ratio greater than 5:1.

When coated by the method of the present invention, the surface of the coated substrate exhibits a high DOI. The successive rigid and flexible primer coatings perform complementarily providing, in addition to improved appearance, good adhesion to the substrate and to each other and good impact resistance. The flexible primer coating acts as an energy absorber cushioning the topcoat and the rigid primer and preventing film cracking propagation from the topcoat.

In coating multi-component thermoplastic and metal parts, the primed and cured thermoplastic substrate may be assembled with metal parts, and the assembly electrocoated, for example by being submerged in an electrocoating bath. The primed reinforced thermoplastic parts of this invention are not sufficiently conductive to permit plating the electrocoating composition on their surfaces so that only the metal parts are electrocoated. The multi-component assembly is then passed through an oven where the electrocoated primer is cured at temperatures of up to about 400° F.

Primer coatings can be readily formulated by those skilled in the coat art to provide rigid and flexible primer coating compositions. One or both of the primer coatings may contain a conductive pigment. The presence of a conductive pigment enhances topcoating by electrostatic spraying. A color coat (monocoat) or basecoat/clearcoat topcoat may be applied to the primed substrate. Commercially available topcoats may be used.

DETAILED DESCRIPTION

The reinforced thermoplastic substrates which are coated by the method of this invention are those which exhibit surface irregularities upon cooling after being coated and cured at elevated temperatures. Preferred materials are polyester based such as those described in U.S. Pat. Nos. 4,753,980, 4,486,564, 4,548,978 and 4,172,859, which are manufactured and sold by E. I. Du Pont de Nemours and Company under the trademark "Bexloy". The disclosures of these patents are incorporated herein by reference. Other thermoplastic materials which exhibit properties similar to the polyester based materials such as modified expoxies, polyurethanes, polyethylene, acrylics, polyvinyl chloride, acrylonitrile and various polyhydrocarbons such as polypropylene may be used to form the substrate.

The reinforcing material can be glass, carbon or aramide fibers, glass flake or beads, mica and like particles which have an average diameter greater than 5 microns and an average aspect ratio greater than 5:1. Glass is a preferred material. The reinforced compositions will generally contain from about 1 to 40 percent by weight and preferably from 5 to 35 percent by weight of reinforcing material. Thermoplastic compositions of the type disclosed in U.S. Pat. No. 4,753,980 containing from about 10 to 30 percent by weight of glass flake and fiber are preferred compositions.

The primer coating compositions used in the method of this invention may be selected from known rigid and flexible compositions. Among the rigid primer coating compositions are those based on crosslinkable resinous compositions comprising hydroxyl-containing acrylic polymers and flexible polyesters which are crosslinked with a melamine resin. The acrylic polymer is preferably used in amounts of about 50 to 80 percent by weight of the total resin solids. Of the remaining components, preferably 50 to 20 percent by weight of the total resin solids is melamine resin. Suitable rigid primers include acrylic based primers prepared from compositions such as those disclosed in U.S. Pat. No. 4,591,533. Rigid primers useful in practicing the present invention have an elongation of from 10 to 25 percent at 68° F. and 3 to 10 percent at −20° F.

Among the flexible primer coating compositions are those based on crosslinkable resinous compositions comprising branched polyester urethanes and flexible polyesters which are crosslinked with a melamine resin. The polyester copolymer is preferably used in amounts of about 50 to 80 weight percent of the total resin solids. Of the remaining, preferably 50 to 20 percent by weight of the total resin solids is melamine resin. Suitable polyester urethane based primers are disclosed in U.S. Pat. Nos. 4,614,683 and 4,410,668. Flexible primer compositions such as those from polyol, polyepoxide, blocked polyisocyanate cross linking agent and a phenolic resin of the type disclosed in U.S. Pat. No. 4,680,346 may also be used. Flexible primers useful in practicing the present invention have an elongation of 40 to 70 percent at 68° F. and 20 to 40 percent at −20° F.

Elongation of the rigid and flexible primers used in practicing this invention is measured by spraying the primer onto a nylon or other substrate to a thickness of 1.5 mils. The substrate is selected from a material to which the coating does not adhere after being cured. The cured coating is lifted from the substrate, and elongation is determined on the free film using an "Instron" Model 1122 tester.

The melamine resins used may be alkylated melamine formaldehyde crosslinking resins. Typically these resins have 1 to 8 carbon atoms in the alkyl group. Methylated melamine formaldehyde resins such as "Cymel" 380 and methylated melamine formaldehyde resins containing methoxymethyl imino groups such as "Cymel" 325 are preferred to form a high quality primer. Benzoguanamine-formaldehyde and urea-formaldehyde resins may also be used.

Conductive pigments may be included in either one or both of the primer compositions. The pigment content of the composition is usually expressed as the the pigment to binder weight ratio. For conductive black pigments the ratio is generally within the range of 0.02 to 0.05:1 and for non-carbon conductive pigments 0.2 to 0.4:1. The type and amount of conductive pigment used in not sufficient for adhering coating to the thermoplastic substrate in an electrocoating operation.

The primer coatings may also contain optional ingredients such as flow control agents and other formulating additives. If these ingredients are present, they are usually present in amounts of up to 2 percent by weight of the primer coating composition.

For optimum curing at temperatures of 250° F. to 350° F., the primer compositions should contain a catalyst. The amount of catalyst useful is typically up to 3, preferably 0.5 to 1.5 percent by weight based on the weight of resin solids. The acid catalyst increases the rate of crosslinking of the composition on curing. Phosphoric acid, sulfonic acid or a substituted sulfonic acid can be used such as para-toluene sulfonic acid, dodecylbenzene sulfonic acid and di-nonylnaphthalene disulfonic acid. A preferred acid is dodecylbenzene sulfonic acid.

The coating compositions contain organic solvents which are volatile and are removed when the coating is cured. Curing by heating at low temperatures is preferred. Examples of suitable solvents are alcohols, esters, ethers and aromatic hydrocarbons. Usually, the organic solvent is present in amounts of up to 55 percent by weight, preferably 30 percent to 55 percent by weight, based on total weight of solvent and resin solids. Temperatures from as low as 250° F. to as high as 400° F. may be used.

In formulating the primer composition a grinding resin is prepared using, in a preferred embodiment, conductive carbon black pigment, resin and a portion of the solvent. The ingredients are mixed as a paste and ground in a steel ball mill, sand mill, pebble mill or by other techniques well known to those of ordinary skill in the art.

The primer coating compositions can be applied to the substrate by any of the conventional coating techniques such as brushing, spraying or dipping. Spraying is preferred. Any of the known spraying techniques may be employed such as compressed air spraying, electrostatic spraying, using either manual or automatic methods. If spraying is used, the viscosity of the primer coating composition should be adjusted with additional solvent, if neccessary, to provide a No. 2 Fisher cup viscosity of 15 to 30 seconds.

The primer compositions should contain sag control agents. For good rheology control silica and a diurea polymer are used so that a flexible primer coating of from 1 to 5 mils can be sprayed, wet-on-wet, over the rigid primer coating.

After the primer coatings have been applied to the thermoplastic substrate, a topcoat or basecoat/clearcoat can be applied to the primed surface. Commercially available topcoating compositions used for automotive applications can be used.

As will be further described in the Examples which follow, a rigid primer is first applied to a reinforced thermoplastic substrate. This primer is preferably sprayed onto the substrate to give a coating thickness of from 1 to about 2 mils. The coating thickness may be achieved by applying more than one coating with up to a minute flash drying (air flash) between coats. After about three minutes air flash, the flexible primer is sprayed, wet-on-wet, onto the coated substrate to provide a flexible primer coating thickness of 1 to 5 mils. The coating thickness may be achieved by applying more than one coating, again with up to a minute air flash between coatings. The composite coating which has a thickness from about 2 to 7 mils is then baked at a temperature from 250° F. to 280° F. for about 30 minutes after which time the primed substrate is assembled with a metal part and submerged in an electrocoating bath. The primed substrate/electrocoated metal assembly is baked for about 30 minutes at a temperature from 350° F. to 400° F. A commercially available top coating is then applied to the assembly and cured in the usual manner.

The following Examples, in which parts and percentages are by weight unless otherwise specified, further illustrate the present invention.

EXAMPLE A

A pigment paste was prepared using the polyester urethane solution described in Example 1 of U.S. Pat. No. 4,632,964 by mixing and grinding the following ingredients in a steel ball mill to a Hegman No. 6.75 grind.

| Ingredients | Resin Solids (grams) | Pigment Solids (grams) | Total Weight (grams) |
| --- | --- | --- | --- |
| Polyester Urethane Solution | 23.4 | | 29.3 |
| High imino (—NH) methylated melamine formaldehyde resin (70% methylated based on triazine having Mn 600 and a degree of polymerization of about 2.3) | | | 17.5 |
| Methyl ethyl ketone | | | 9.2 |
| Diisobutyl ketone | | | 27.4 |
| Drier solution (Managanese naphthanate-6% solution) | | | 1.7 |
| Carbon black pigment | | 8.4 | 8.4 |
| Ethylene glycol monobutyl ether acetate | | | 6.5 |
| | | | 100.0 |

EXAMPLE 1

A rigid acrylic conductive primer was prepared using a nonaqueous acrylic resin dispersion described in Example 1 of U.S. Pat. No. 4,591,533 using the following ingredients.

| Ingredients | Resin Solids (grams) | Pigment Solids (grams) | Total Weight (grams) |
| --- | --- | --- | --- |
| Acrylic resin dispersion | 13.0 | | 19.7 |
| Acrylic resin solution (in xylene) Acid No. 3-5, hydroxyl No. 140-170 | 18.1 | | 24.7 |
| Methylated/butylated melamine formaldehyde (92% formylated, 70% alkylated; 37% methylated and 33% butylated based on triazine having Mw 1300, Mn 900 and a degree of polymerization of about 2.0) | 13.7 | | 14.1 |
| Flow agent | 0.04 | | 0.1 |
| Silicon solution (polyether modified methylalkyl polysilane) | | | 0.3 |
| silica (sand milled dispersion of colloidal silicon dioxide in melamine of this Example and butanol solvent having a silica solids content of 12% by weight) | 3.5 | 0.9 | 7.4 |
| Pigment paste of Example A | 6.1 | 1.4 | 15.9 |
| Methanol | | | 1.5 |
| Xylene | | | 6.9 |
| Butyl propionate | | | 8.2 |
| Dodecylbenzene sulfonic acid solution | 0.6 | | 1.2 |
| | | | 100.0 |

EXAMPLE 2

A flexible branched polyester primer was prepared using the polyester urethane solution of Example 1 of U.S. Pat. No. 4,632,964 combined with the following ingredients:

| Ingredients | Resin Solids (grams) | Pigment Solid (grams) | Total Weight (grams) |
| --- | --- | --- | --- |
| Polyester urethane solution | 12.2 | | 15.4 |
| 3.2% diurea resin solution[1] | 10.0 | | 14.8 |
| Melamine solution (See Example 1) | 15.5 | | 16.2 |
| Silica dispersion (See Example 1) | 3.2 | 0.8 | 6.7 |
| Pigment paste of Example A | 8.8 | 2.0 | 23.0 |
| Methanol | | | 1.9 |
| Xylene | | | 20.6 |
| Acrylate flow additive | 0.08 | | 0.2 |
| Acid catalyst solution (See | 0.6 | | 1.2 |

-continued

| Ingredients | Resin Solids (grams) | Pigment Solid (grams) | Total Weight (grams) |
|---|---|---|---|
| Example 1 | | | 100.0 |

[1] Prepared from hexamethyene diisocyanate with benzylamine in the presence of a polyester urethane resin.

EXAMPLE 3

A rigid polyester primer was prepared using a neopentyl glycol trimethylol propane polyester solution with the following ingredients:

| Ingredients | Resin Solids (grams) | Pigment Solids (grams) | Total Weight (grams) |
|---|---|---|---|
| Polyester solution (Acid No. 10-20, hydroxyl No. 130-170) | 33.3 | | 41.6 |
| Melamine (50/50 methylated/butlyated melamine formaldehyde, 92% formylated, 70% alkylated; 37% methylated, 33% butylated base on triazine having Mw 750, Mn 590 and a degree of polymerization of (1.6) | 18.6 | | 18.6 |
| Pigment paste of Example A | 5.5 | 1.2 | 13.4 |
| Methanol | | | 2.8 |
| Butanol | | | 10.0 |
| Butyl acetate | | | 10.8 |
| Ethylene glycol monobutyl ether acetate | | | 2.8 |
| | | | 100.0 |

The rigid primer compositions of Examples 1 and 3 were each sprayed directly onto panels (4 by 12 inches) prepared from a glass reinforced thermoplastic resin of the type described in U.S. Pat. No. 4,753,980. Containing 18% by weight glass flakes (average diameter 1/64 inch and average aspect ratio approaching 20:1) and 2.5% by weight glass fibers (PPG industries, Inc. No. 3540, 10 microns diameter and 25-40:1 aspect ratio). The rigid primer coating was applied to give a thickness between 1 and 1.5 mils. After air flash for about 1 to 5 minutes at ambient temperature, each panel was sprayed, wet-on-wet, with the flexible primer composition of Example 2 at a rate to provide a thickness of between 3 and 3.5 mils. After about 10 minutes air flash, the primed substrates were heated for 30 minutes at a temperature between 250°-270° F. and then overbaked for 30 minutes at 365° F. The cured primers had a thickness in each case between 4 and 5 mils.

An automotive quality topcoat composition was then applied directly to each of the primed panels. The topcoat composition was a color-clear coat system in which the color coat, available from E. I. Du Pont de Nemours and Company as 871 line (silver), was first spray applied directly to the primed surface. The basecoat was given an air flash at ambient temperature for about 2 minutes and then a clear coating composistion available from E. I. Du Pont de Nemours and Company as RK-3840 was spray applied to the basecoat. The composite coating was then heated at 265° F. for 30 minutes to coalesce and cure the topcoat. The gloss, distinctness of image and impact resistance of the coatings are reported in the tables which follow. For purposes of comparison, steel and reinforced thermoplastic panels were topcoated as described above. The properties of these coated substrates are also reported in the Table 1 which follows.

TABLE 1

| Primer | Primer bake 30 min. @265° F. | Overbake 30 min. @365° F. | Adhesion[1] of primer topcoat | Gloss[2] (20°) | DOI[3] | Impact[4] in-lbs. −30° C. |
|---|---|---|---|---|---|---|
| Examples 1 + 2 | Yes | Yes | 5 | 79 | 70 | 10 |
| Examples 3 + 2 | Yes | Yes | 5 | 81 | 70 | 10 |
| Example 1 | Yes | Yes | 5 | 83 | 62 | 6 |
| None | Yes | Yes | 4 | 80 | 50 | — |
| None[5] | — | — | 5 | 88 | 73 | — |

[1] ASTM D-3359; the higher the value, the better the adhesion
[2] Measured with a 20° gloss meter manufactured by Gardner Instrument Co.
[3] Distinctness of image determined using a Hunter Laboratory DORI Meter D-47-6
[4] Rheometric Impact Test, ASTM D3763, modified, velocity at 5 miles per hour
[5] Steel substrate electrocoated and topcoated; topcoat baked at 265° F. for 30 min.

EXAMPLE 4

Two automobile fenders molded from "Bexloy" K550 (trademark for E. I. Du Pont de Nemours and Company's glass reinforced thermoplastic resin, see Example 3) were primed with the rigid primer of Example 1 by spraying to give a film thickness of 1.5-1.8 mils. A coating of the flexible primer of Example 2 was then applied over the rigid primer, wet-on-wet, to give a film thickness of 3.0 mils and baked as described in Example 3. Experiments were carried out to simulate conditions where the fenders would be attached to an automobile body and the assembly would be submerged in an electrocoating primer bath. Steel panels were coated with electrocoating primer and baked for 30 min. at 350° F. The assemblies are then spray topcoated using an 872 line black basecoat and RK-3840 clearcoat described in Example 3 giving film thicknesses of 0.8-1.2 and 1.6-1.8 mils, respectively, and then baked for 30 min. at 250° F. The finished coating on the fenders and the steel panels was examined visually with no apparent difference in quality of the coating on the two different substrates being noted. The coated substrates were then examined for distinctness of image using a Hunter Laboratory DOI meter. The results are shown in Table 2.

TABLE 2

| | Fender | Steel |
|---|---|---|
| Set 1 | 83 | 83 |
| Set 2 | 90 | 94 |

I claim:

1. A method for improving the properties of coated reinforced thermoplastic substrates which form surface irregularities when cooled after being heated to elevated temperatures comprising the steps of
    (a) applying to the reinforced thermoplastic substrate, wet-on-wet, a first coating comprising a rigid primer composition and a second coating comprising a flexible primer composition,
    (b) curing the composite primer coating,
    (c) applying a topcoating to the cured primer coating, and
    (d) curing the topcoating.

2. The method of claim 1 wherein the reinforced thermoplastic substrate is a polyester based substrate reinforced with glass.

3. The method of claim 2 wherein said glass is selected from glass fibers and glass flakes.

4. The method of claim 2 wherein said substrate contains from 1 to 40 percent by weight of glass, said rigid primer has an elongation of 10 to 25 percent at 68° F. and 3 to 10 percent at −20° F., and said flexible primer has an elongation of 40 to 70 percent at 68° F. and 20 to 40 percent at −20° F.

5. The method of claim 1 wherein said topcoating comprises a basecoat and a clearcoat.

6. The method of claim 1 wherein at least one of the primer compositions contains a conductive pigment.

7. The method of claim 4 wherein said rigid primer composition is an acrylic based primer composition and said flexible primer composition is a polyester based primer composition.

8. The method of claim 6 wherein one or more of said primer compositions contains one or more sag control agents selected from silica and diurea polymer.

9. The method of claim 1 wherein the primed and cured reinforced thermoplastic substrate is assembled with a conductive metal part, the assembly is submerged in an electrocoating primer bath for coating the metal part, and thereafter the topcoating is applied to the assembly.

10. An article coated by the method of claim 1.

11. An article coated by the method of claim 9.

* * * * *